(12) United States Patent
Williams

(10) Patent No.: US 12,272,916 B2
(45) Date of Patent: Apr. 8, 2025

(54) PRONG SEPARATOR TOOL FOR TRUCK TRAILER LIGHT RECEPTACLE PINS

(71) Applicant: Michael Williams, Worth, IL (US)

(72) Inventor: Michael Williams, Worth, IL (US)

(*) Notice: Subject to any disclaimer, the term of this patent is extended or adjusted under 35 U.S.C. 154(b) by 485 days.

(21) Appl. No.: 17/574,034

(22) Filed: Jan. 12, 2022

(65) Prior Publication Data

US 2022/0239046 A1 Jul. 28, 2022

Related U.S. Application Data

(60) Provisional application No. 63/142,180, filed on Jan. 27, 2021.

(51) Int. Cl.
*H01R 43/00* (2006.01)
*B25B 33/00* (2006.01)
*B60D 1/64* (2006.01)

(52) U.S. Cl.
CPC .......... *H01R 43/002* (2013.01); *B25B 33/00* (2013.01); *B60D 1/64* (2013.01); *H01R 2201/26* (2013.01)

(58) Field of Classification Search
CPC .. B25B 33/00; H01R 43/002; H01R 2201/26; B60D 1/64
USPC ................................................. 81/485, 125.1
See application file for complete search history.

(56) References Cited

U.S. PATENT DOCUMENTS

| | | | |
|---|---|---|---|
| 619,651 A * | 2/1899 | Adams | B21D 28/34 72/464 |
| 1,323,056 A * | 11/1919 | Hoffmann | B25B 13/48 81/177.85 |
| 2,527,492 A | 10/1950 | Cleary et al. | |
| 2,651,840 A | 9/1953 | Taylor | |
| 2,839,958 A | 6/1958 | Bundy | |
| 2,917,954 A * | 12/1959 | Capelle | G01B 5/25 81/439 |
| 3,229,495 A | 1/1966 | Tostensen | |
| 4,034,595 A * | 7/1977 | Smith | B21D 39/025 81/488 |
| 4,072,381 A | 2/1978 | Burkhart | |
| 4,404,874 A | 9/1983 | Lieser | |
| D271,372 S * | 11/1983 | Fortune | D8/107 |
| 4,416,143 A * | 11/1983 | Fouroux | H01R 43/00 72/479 |
| 4,723,922 A | 2/1988 | Rush | |

(Continued)

FOREIGN PATENT DOCUMENTS

| DE | 19830878 | 1/1999 |
|---|---|---|
| WO | WO2005031176 | 7/2005 |

OTHER PUBLICATIONS

Hella. Electrical Vehical Installation.

*Primary Examiner* — Hadi Shakeri
(74) *Attorney, Agent, or Firm* — Rockman Videbeck & O'Connor

(57) ABSTRACT

A tool for separating dual-prong male electrical split contact pins in a truck trailer electrical system receptacle, where the dual-prong male electrical split contact pins have a gap between the prongs. A housing has a bore extending along the axial length of the housing and an opening to the bore at an end of the housing. A wedge element having a linearly extending substantially pointed tip or a conical shaped substantially pointed tip is fixed in the bore, and the pointed tip of the wedge element is in communication with the opening of the bore.

18 Claims, 8 Drawing Sheets

(56) References Cited

U.S. PATENT DOCUMENTS

| | | | | |
|---|---|---|---|---|
| 5,203,382 | A | * | 4/1993 | Barnhart .............. H01R 43/002 |
| | | | | 140/123 |
| 5,385,476 | A | | 1/1995 | Jasper |
| 5,795,195 | A | | 8/1998 | Karlsberger |
| 5,816,825 | A | | 10/1998 | Sekimori et al. |
| 6,511,268 | B1 | * | 1/2003 | Vasudeva ............ B23B 31/1071 |
| | | | | 408/239 R |
| 7,188,556 | B1 | * | 3/2007 | Rinner .................. B25B 23/142 |
| | | | | 81/477 |
| 7,334,506 | B2 | * | 2/2008 | Hui ....................... B25B 13/102 |
| | | | | 81/DIG. 11 |
| 8,146,241 | B1 | | 4/2012 | Thompson, Sr. et al. |
| 9,300,080 | B2 | | 3/2016 | Puluc |
| 10,256,571 | B2 | | 4/2019 | Chapel et al. |
| 10,622,762 | B1 | | 4/2020 | McKee |
| 2003/0054702 | A1 | | 3/2003 | Ferderer |
| 2007/0245862 | A1 | | 10/2007 | Gonzalez et al. |
| 2012/0234730 | A1 | | 9/2012 | Yager |

* cited by examiner

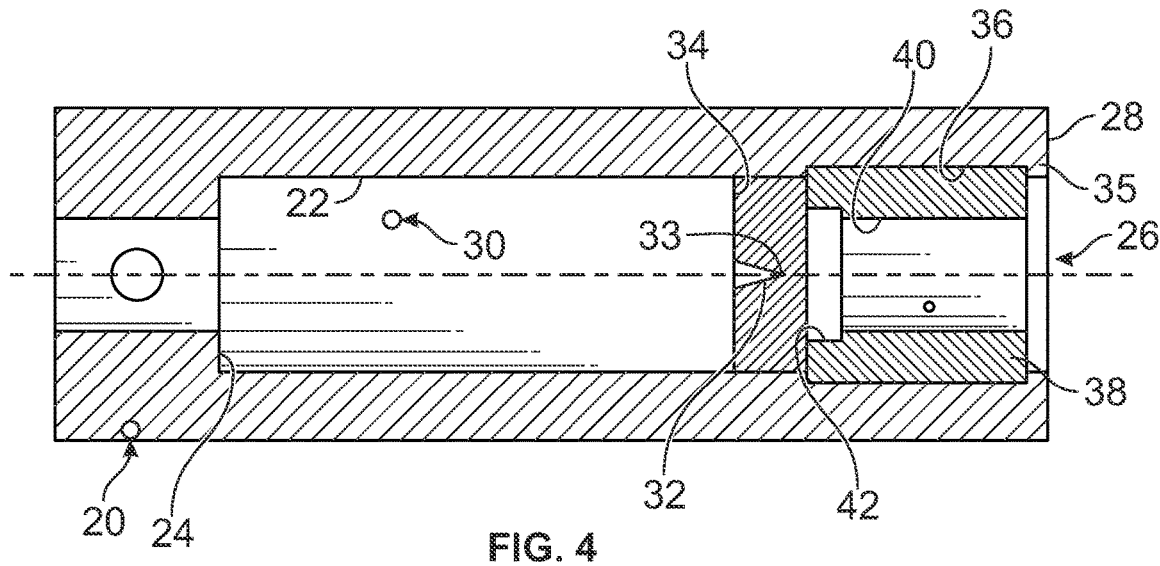
FIG. 4
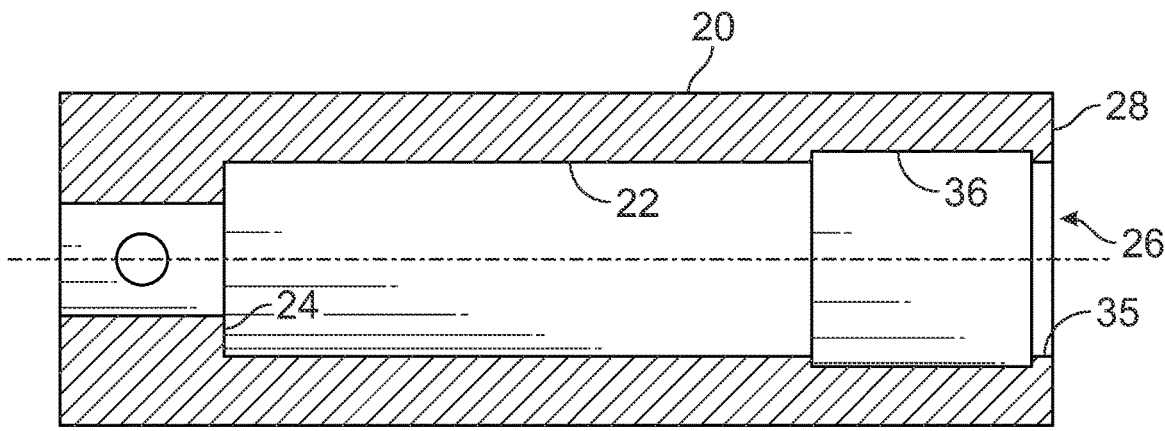
FIG. 5
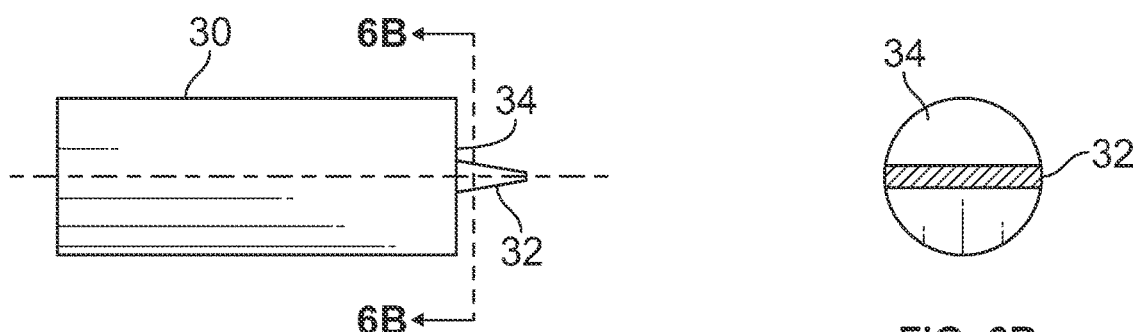
FIG. 6A
FIG. 6B

PRONG SEPARATOR TOOL FOR TRUCK TRAILER LIGHT RECEPTACLE PINS

This Application claims priority to provisional application No. 63/142,180 filed Jan. 27, 2021, to the extent allowed by law.

FIELD OF THE INVENTION

The present invention relates to a pin separator tool for double-prong male electrical receptacle pins, and in particular to a double-prong spreading apparatus to widen the gap between the male split prongs in a multi-split pin truck trailer electrical system receptacle.

BACKGROUND OF THE INVENTION

After a trailer has been connected to a hauling truck tractor, an electrical connection must be made between the electrical system of the trailer and the various lighting circuits of the trailer. The lighting circuits of the trailer typically include clearance markers, license plate lights, tail lights, right and left turn lights, stop or brake lights, auxiliary/ABS lights and a ground return.

Mounted to the front of the trailer is a male receptacle assembly 10 (FIGS. 1, 2) that includes a plurality of double-prong electrically conductive spring steel pins 12, having a gap 14 between each pair of prongs, as shown in FIGS. 1, 2 and 3B. The gap 14 extends approximately one-half the axial length of each pin 12. A female plug 16 (FIG. 3C) comprises an equal number of tubular sockets 18 lined with an electrical conductive material that engage the outer surfaces of pins 12 when an electrical connection is made between female connector plug 16 and male receptacle assembly 10. In North America, the male and female connectors are produced in compliance with SAE J560, the U.S. standard describing electrical connections between heavy duty tractor trucks and trailers, which standard includes primary connectors for lighting and auxiliary connections for supplemental functions. It has been determined that split pins are advantageously used in about ninety percent of receptacles used on trailers today since the fact that they can be spread after being used many times allows for longer pin usefulness. The presently disclosed invention provides a relatively fast and efficient way to spread the prongs of a split-pin receptacle.

After multiple connections and disconnections between male receptacle assembly 10 and female connector plug 16, it has been discovered that the dual prongs of split pins 12 come closer together in a resting stage such that the prongs do not properly contact the conductive inner surfaces of sockets 18 of female connector plug 16 upon connection. The surfaces of split pins 12 eventually become closed or nearly closed, and the gap 14 closes causing flickering of lights on the trailer because the prongs of split pins 12 and the walls of sockets 18 are not making sufficient and continued contact to provide an efficient electrical connection.

Referring to FIGS. 2, 3A and 3B, all of the split pins 12 are not of the same diameter. A larger pin 12a is a ground pin and has a larger diameter compared to the remaining electrical connector pins 12b.

Today, when a truck operator notices that the trailer lights may be flickering, the truck operator usually uses a screwdriver or pen knife blade in an effort to spread apart the prongs of pins 12 of the male receptacle assembly 10, resulting in the application of varying and uneven force to the prongs of split pins 12. On many occasions, this results in one or both of the prongs breaking off, leading to the need to replace the entire male receptacle assembly at a cost of $200 or more. Also, the tip of a pen knife blade may break off between the prongs. Additionally, a shim-type device is available designed to be installed between the male receptacle and the female plug to prevent the plug from wiggling in the receptacle. This device does nothing to separate the prongs of the pins of the male receptacle.

BRIEF DESCRIPTION OF THE DRAWINGS

FIG. 4 is a cross-section assembly view of one end of the pin spreader of one embodiment of the present disclosure.

FIG. 5 is a cross section detail view of a portion of the housing for the prong separator of the embodiment of FIG. 4.

FIG. 6A is a cross-section detail view of the insert and wedge element of the prong separator of the embodiment of FIG. 4.

FIG. 6B is an end view of the insert and wedge element of the prong separator of FIG. 4, taken along line A-A of the embodiment of FIG. 6A.

DESCRIPTION OF THE ILLUSTRATED EMBODIMENTS

Figure 1:
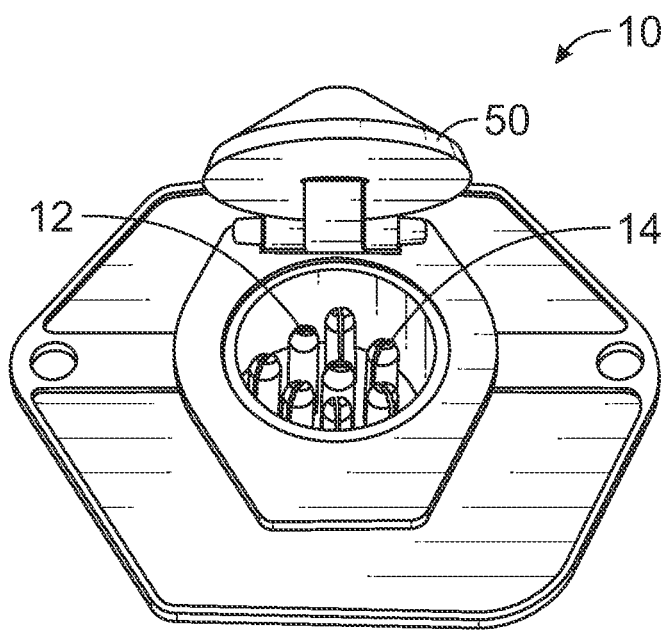
FIG. 1 is a front perspective view of a male multi-pin electrical receptacle assembly adapted to be mounted on a tractor trailer.

Referring to the first embodiment of the prong separator tool illustrated in FIG. 4, a housing 20 has a bore 22 extending from a wall 24 to an opening 26 at one end 28 of the housing. A solid metal insert 30, such as stainless steel or the like, is tightly secured against movement in bore 22, and in this embodiment, a substantially pointed wedge element 32 extends linearly across one end 34 of insert 30 as shown in FIGS. 6A and 6B. In this embodiment, wedge element 32 is generally triangular in cross section as shown in FIG. 6A and the tip of wedge element 32 extends linearly and diametrically across end 34 of insert 30 in a solid tent-like configuration. The opening 26 of bore 22 includes a radiused surface or flange 35 (FIGS. 4, 5) having an inner diameter slightly less than the diameter of opening 26 of housing 20.

The tip of wedge element 32 is not an absolute or sharp point, since an absolute or sharp point would break off due to lack of lateral support at points adjacent the pointed tip. In practical construction, the tip of wedge element 32 may be slightly round or flat, but still be considered pointed for the purposes of the present disclosure. In this specification, the term "substantially pointed wedge element" is used to define the wedge element 32, illustrated in FIGS. 4, 6A, 6B, 10, 11, 13 and 14 of the present disclosure to refer to a wedge element that is not absolutely a sharp point.

Figure 7A:
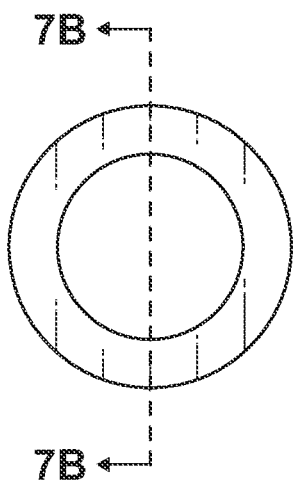
FIG. 7A is a top detail view of one embodiment of connector support guide for a quarter inch diameter spring steel pin.
Figure 7B:
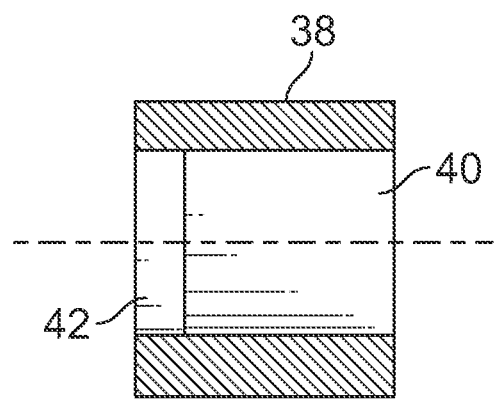
FIG. 7B is a cross section detail view of the connector support guide of FIG. 7A, taken along line A-A of FIG. 7A.
Figure 8A:
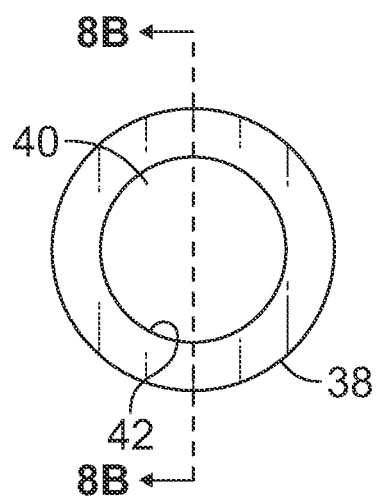
FIG. 8A is a top detail view of another embodiment of connector support guide for a three-sixteenth inch diameter spring steel pin.
Figure 8B:
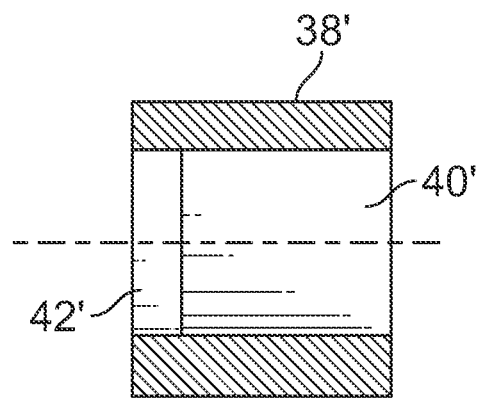
FIG. 8B is a cross section detail view of the connector support guide of FIG. 8A, taken along line A-A of FIG. 8A.

The end 28 of bore 22 adjacent opening 26 has a larger diameter portion 36 than the remaining diameter of bore 22. For example, and not by way of limitation, bore 22 in a first configuration may have a diameter of 0.3750 inches, while end 28 of housing 20 may have a diameter of 0.3940 inches. A guide insert 38 (FIGS. 4, 7, 8) is fixedly located in larger diameter portion 36 of bore 22. Guide insert 38 includes a bore 40 having, in one example, an inner diameter of 0.2570 inches. Bore 40 also includes a counterbore 42 which by way of example could have an inner diameter of 0.2650 inches in this configuration. In a second configuration (FIG. 8) guide insert 38' includes bore 40' having, in another example, an inner diameter of 0.1950 inches and a counterbore 42' of 0.2050 inches. The guide inserts 38, 38' (FIGS. 7, 8) are made of a malleable material, such as plastic, nylon, or any suitable material or composite material as is known in the art.

Figure 9:
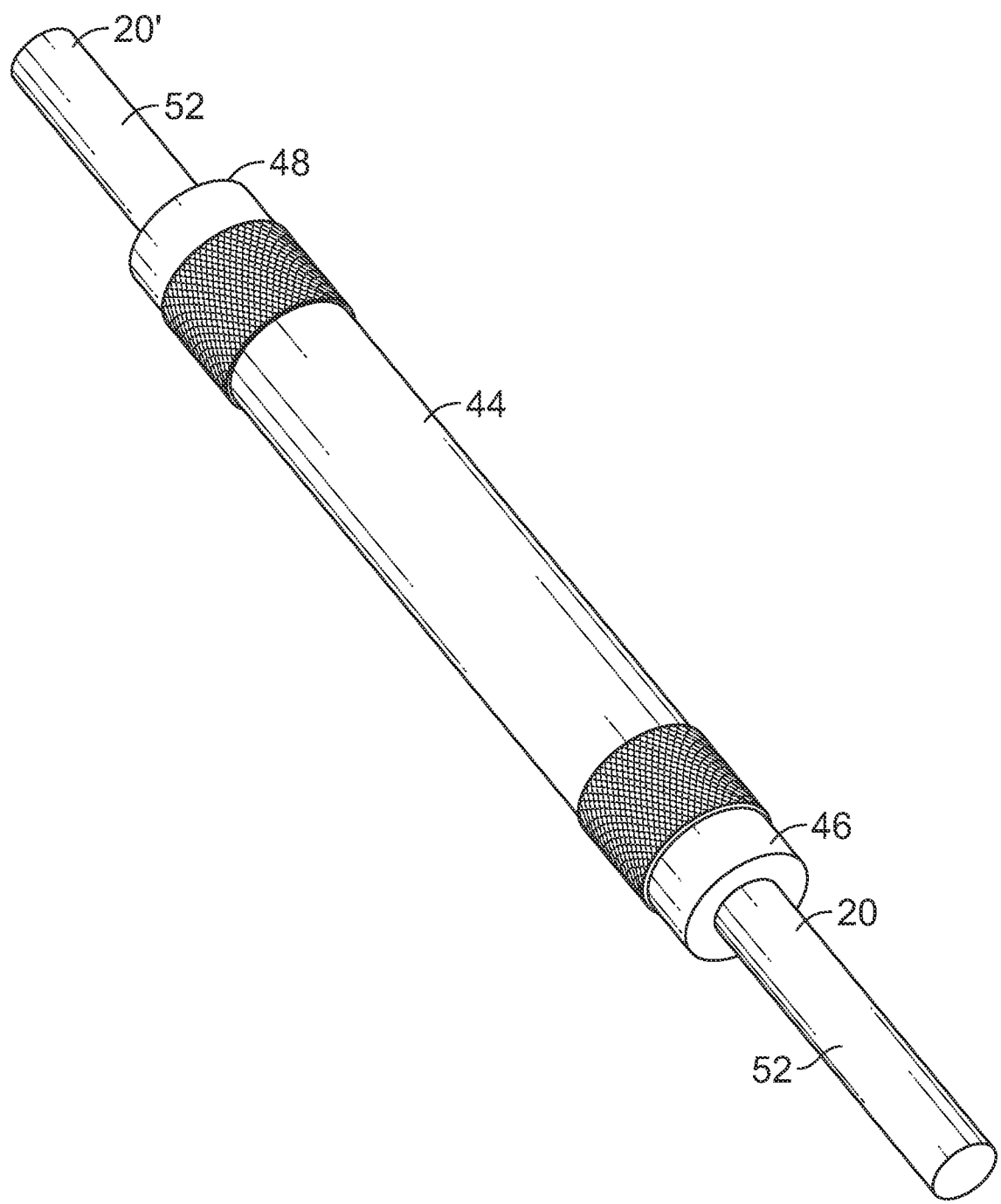
FIG. 9 is a top perspective view of a prong separator tool assembly having different sized apertures on either end of the tool.

Referring to FIG. 9, a first housing 20 is attached to one end 46 of a shaft 44, and a second housing 20' is attached to an opposite end 48 of shaft 44. In this configuration by way of example and not as a limitation, the guide insert 38 (FIG. 7) in housing 20 has an inner diameter of approximately 0.195 inches, and the guide insert 38' (FIG. 8) in housing 20' has an inner diameter of approximately 0.257 inches. As will be explained below, housing 20 on one end 46 of shaft 44 is configured to spread the spring steel prongs of split pins 12b of male receptacle assembly 10, and housing 20' on the opposite end 48 of shaft 44 is configured to spread the spring steel ground prong of split pin 12a of male receptacle assembly 10. A pair of radially opposed axially-directed alignment lines 52 extend along the outer surface of housings 20, 20' to indicate to the user the direction in which the tip of wedge element 32 is extending, thus allowing wedge element 32 of the first embodiment to be aligned with the split opening of pin 12a and pins 12b.

Referring to FIG. 4, guide insert 38 has a slightly larger outer diameter than the diameter of opening 26 of radiused surface 35 at end 28 of housing 20. To install guide insert 38 into bore 22 of housing 20, the malleable guide insert 38 is heated and then squeezed through radiused surface 35 until the guide insert is seated in larger diameter portion 36 of bore 22, as shown in FIG. 4. Radiused surface 35 then holds guide insert 38 in its proper place in housing 20.

Figure 2:
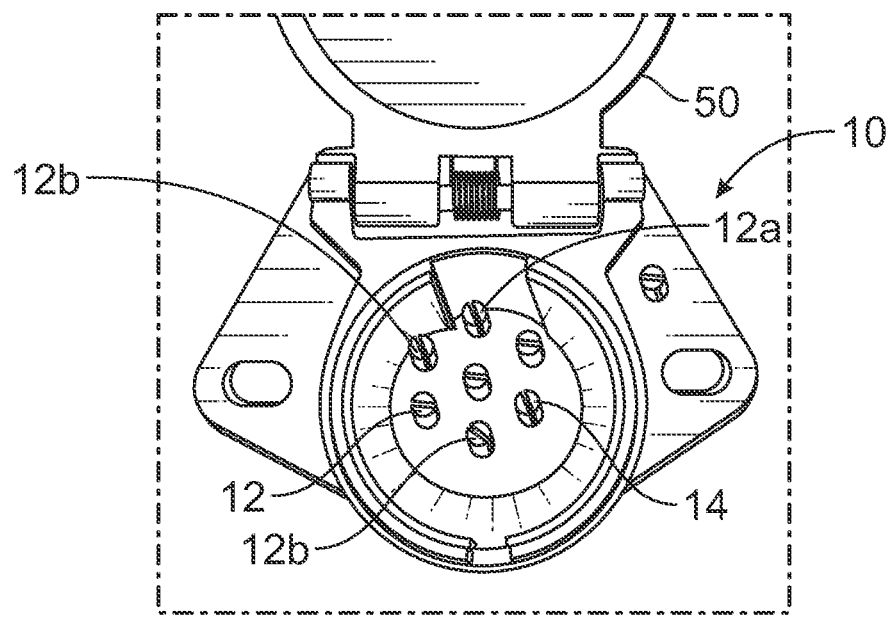
FIG. 2 is a top plan view of the male multi-pin electrical receptacle assembly of FIG. 1, showing the gaps between the spring steel prongs of the pins.
Figure 3A:
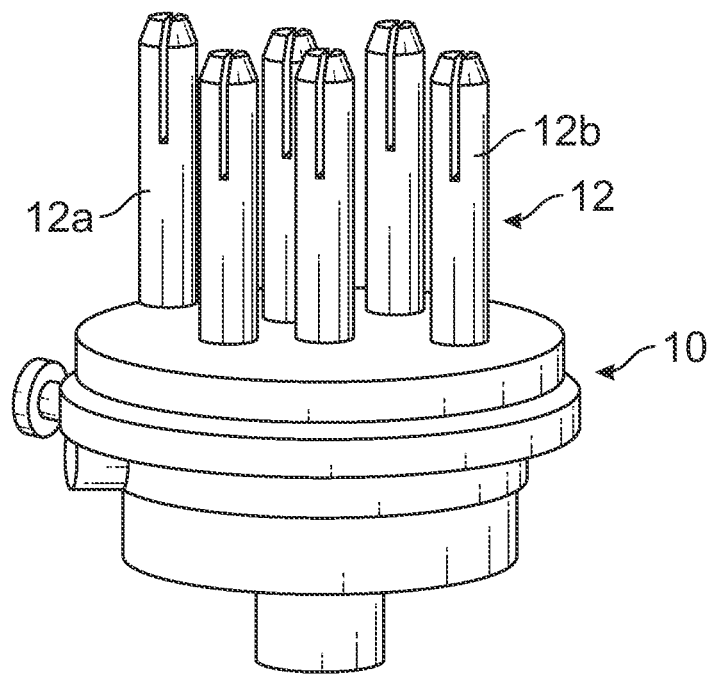
FIG. 3A is a side perspective detail view of the spring steel prongs of the pins of the male receptacle assembly of FIGS. 1 and 2, shown with the pin and prong assembly removed from the male receptacle assembly.
Figure 3B:
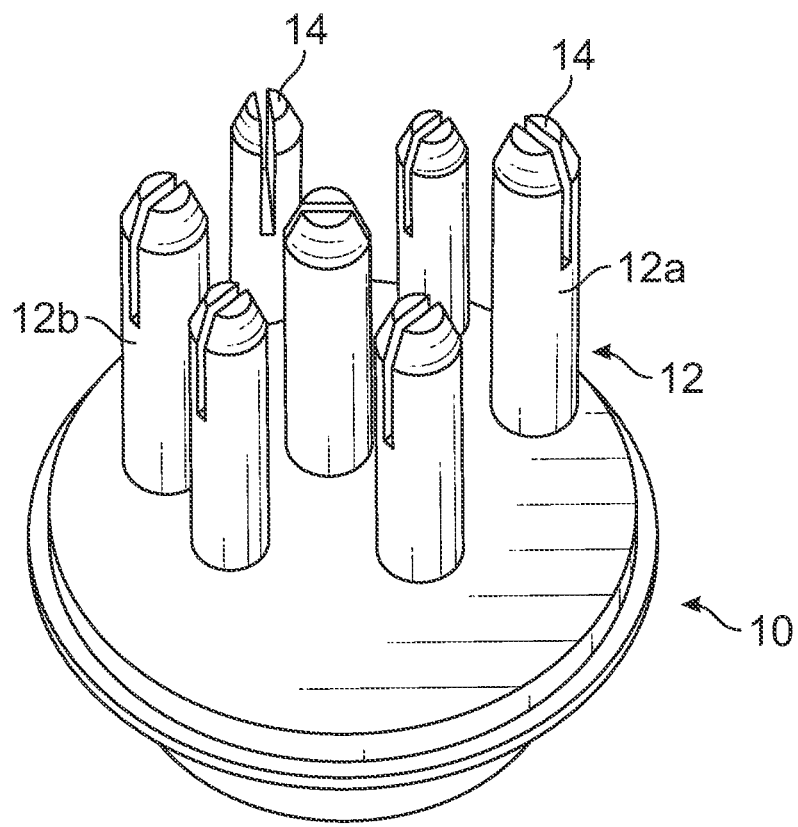
FIG. 3B is a top perspective view of the spring steel pins and prongs of FIG. 3A.
Figure 3C:
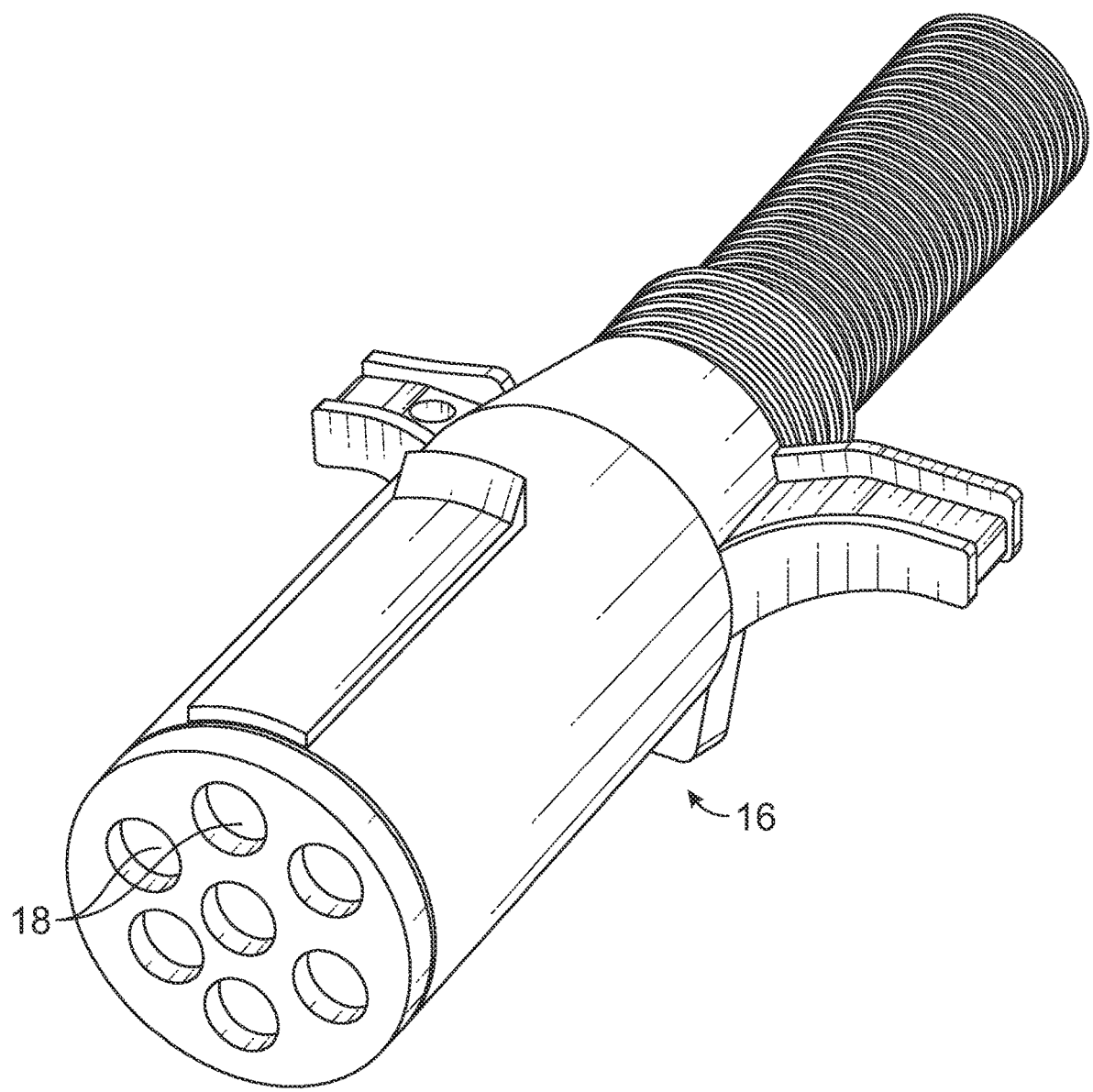
FIG. 3C is a front side perspective view of a female connector plug.

In operation of the first embodiment, once the tractor operator notices that the trailer light system is flickering or is otherwise not fully functioning after male receptacle assembly 10 is connected with female connector plug 16, the female connector plug 16 is removed from male receptacle assembly 10. With receptacle cover 50 opened, (FIGS. 1, 2), the operator determines which split pins 12a, 12b have a decreased or no gap 14 between the prongs. If the ground pin 12a has a minimal or no gap 14, housing end 20' is placed in axial alignment over the ground pin. If the other pins 12b are observed to have a minimal or no prong gap 14, housing end 20 is placed in axial alignment over the faulty pins 12b.

Housing 20 or 20' is then axially advanced over the aligned prongs of the faulty split pins 12a or 12b, one at a time, so the prongs of the pin 12a or 12b enter opening 26 at end 28 of housing 20, 20' and wedge element 32 abuts the space between the tips of the subject prongs. The housing 20 is then rotated slightly if necessary, until the tip of wedge element 32 is aligned with and enters gap 14. Housing 20, 20' is then advanced further until it stops. At this point, wedge element 32 has moved into gap 14, separating the spring steel leafs of the prongs of split pins 12a, b to near or beyond their original position. Once wedge element 32 has reached its maximum point of travel, or has reached the bottom of gap 14, the gap 14 between the prongs has been laterally resized, and housing 20, 20' is withdrawn from the subject pin.

This process of repairing the prongs of split pins 12a, b is repeated on other spring steel prongs of pins 12a, b as necessary. It has been determined that once a pair of prongs of a pin 12a, b are separated using the steps mentioned above, the prongs of pins 12a, b will remain properly separated in their expanded state for about one year before the process should be repeated.

During the above-described process, guide insert 38 prevents over-spreading of the prongs of pins 12a, b, thus preventing the prongs from breaking. Further, the prongs of pins 12a, b are normally coated with an anti-rusting, anti-corrosion substance, such as zinc chromate, or other substances as are known in the art. Were the guide insert 38 made of metal, or was not present, the coating over the prongs 12a, b would be removed during the above-described gap-expanding procedure.

As seen in FIG. 4, one end of guide insert 38 includes counterbore 42 having a larger diameter than bore 40 of the guide insert. This space is provided to allow the upper tip of a separating prong of a pin 12a, b to enter during the separating process, if necessary.

Figure 10:
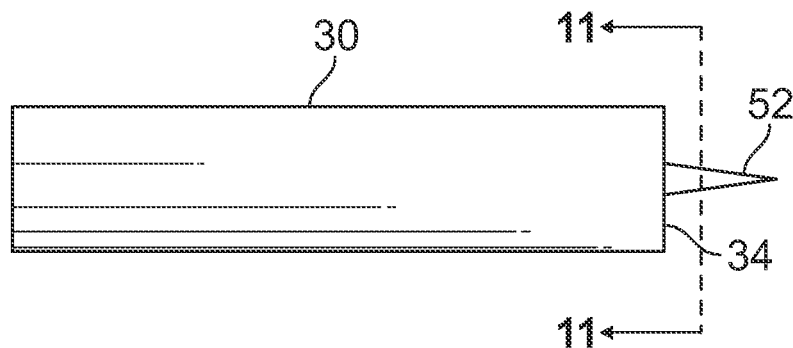
FIG. 10 is a side elevation view of a second embodiment of the metal insert and substantially pointed wedge element of the present invention.
Figure 11:
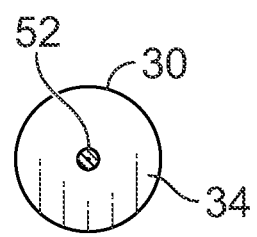
FIG. 11 is an end view of the metal insert and substantially pointed wedge element of FIG. 10, taken along line A-A of FIG. 10.

A second embodiment of the present invention is illustrated in FIGS. 10 and 11, where a conical-shaped substantially pointed wedge element 52 is mounted on end 34 of insert 30, replacing the linearly extending wedge element 32 of the first embodiment. In this embodiment, the outer end of tip 52 must be slightly rounded or flat to prevent breaking of the outer end of tip 52, as previously explained. The operation of expanding the gap between the prongs of pins 12a and 12b is the same as described previously regarding the first embodiment when inserting and advancing housings 20, 20' over the prongs of pins 12a and 12b.

Figure 12:
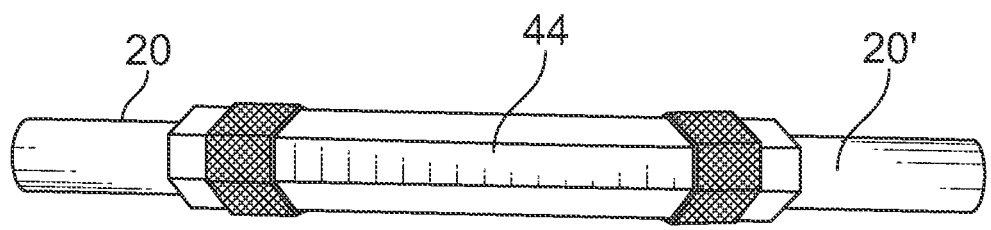
FIG. 12 is a top elevation view of a third embodiment of the shaft of the present disclosure, where the external surface of the shaft has flat surfaces.

A third embodiment of the present invention is illustrated in FIG. 12, where the outer surface of shaft 44 has contiguous flat axially-extending surfaces, such as a hexagonal shape in cross section. In this embodiment, were the pin separating tool dropped to the ground, the flat surfaces of shaft 44 would prevent the tool from rolling on the ground and away from the operator.

Figure 13:
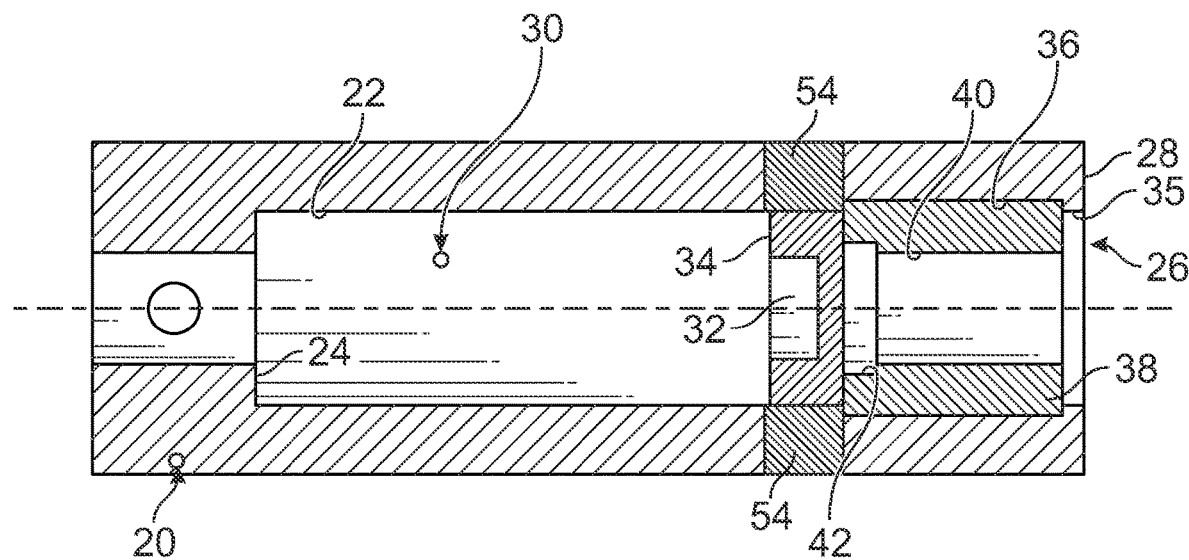
FIG. 13 is a schematic cross section view of a fourth embodiment of the present disclosure where the housing includes transparent segments on opposite sides of the housing providing an operator's view of the alignment of the wedge element of FIGS. 6A and 6B.

A fourth embodiment of the present invention is illustrated in FIG. 13 where housings 20 and 20' include diametrically opposed translucent windows 54, each translucent window 54 aligned with the linear extent of wedge element 32 of the first embodiment. In this embodiment, upon inserting housing 20 or 20' over a pin 12a or 12b as described above, the operator can look through windows 54 to ensure that the linear tip 33 is aligned with the gap 14 formed between the prongs of the respective pin 12a or 12b.

Figure 14:
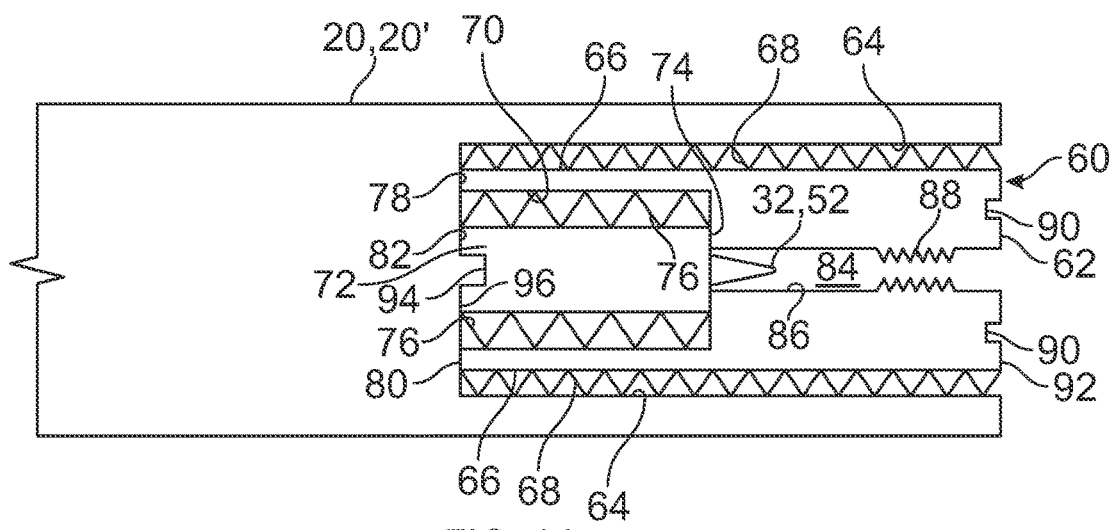
FIG. 14 is a schematic cross section view of a fifth embodiment of the present disclosure where wedge assembly and/or wedge element are removable and replaceable with regard to the housing.

A fifth embodiment of the present invention is illustrated in FIG. 14 where one or both of housings 20, 21' 20' include a removable and replaceable wedge element assembly 60 comprising a first insert element 62 extending into bore 64 of housing 20, 20'. In the illustrated embodiment, bore 64 and the outer surface 66 of first insert element 62 are correspondingly threaded at 68, allowing first insert element 62 to be screwed into bore 64 and held fast (operatively connected) to housing 20, 20'. Other suitable ways of removably securing first insert element 62 in bore 64, as are known in the art, may be used in place of threads 68.

First insert element 62 also includes a bore 70 into which a second insert element 72 is inserted. End 74 of second insert element 72 has linear wedge element 32, or conical wedge element 52, mounted thereon as described previously. Also as described previously, the outer end of tip 32, 52 can be slightly rounded or flat to prevent the outer tip end from breaking.

The inner surface of bore 70 and the outer surface of second insert element 72 are correspondingly threaded, as at 76 of FIG. 14, to allow second insert element 72 to be removably inserted into and held (operatively connected) in bore 70. Where first insert element 62 and second insert element 72 are inserted in bores 64 and 70, respectively, the inner ends 78, 82 of each insert element rests on flat bottom surface 80 of bore 64.

First insert element 62 includes an axially extending entrance bore 84 with wedge element 32, 52 located at the inner end of entrance bore 84. As described previously, wedge element 32, 50 will enter into the gap 14 (FIGS. 1, 2, 36) and spread apart the prongs of pins 12a, 12b when the entrance bore 84 is advanced over the respective prongs.

A portion of the side wall 86 of entrance bore 84 may include a roughened surface portion 88 that will remove any extraneous material such as dirt, metal scrapings, and the like that many have formed on the outer surfaces of pins 12a and 12b when the tool and housings 20, 20' are removed from the respective pins 12a or 12b.

Referring to FIG. 14, if it becomes necessary to replace a worn wedge element 32, 52 from the tool, a suitable wrench or other gripping device is applied to sockets 90 on the outer end 92 of removable wedge assembly 60. Removable wedge assembly 60 is then rotated until wedge assembly 60 is removed from housing 20, 20'. Next, a wrench or other suitable device is inserted into socket 94 on the end 96 of second insert element 72. The wrench is rotated until second insert element 72 is removed from bore 70. A new second insert element mounting a wedge element 32 or 52 is then screwed into bore 70 of first insert element 62 until the second insert element 72 is located in bore 70 as shown in FIG. 14. Then, first insert element 62, with second insert element 72 installed, is screwed back into bore 64 until first insert element 62 is positioned in bore 64 as shown in FIG. 14. The tool is now ready for use as described regarding the previous embodiments.

The foregoing description of the illustrated embodiments of the invention has been presented for purposes of illustration and description, and is not intended to be exhaustive or to limit the invention to the precise form disclosed. The descriptions were selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

I claim:

1. A tool for separating the dual-prong male electrical split contact pins in a truck trailer electrical system receptacle, the dual prong male electrical contact split pins having a gap between prongs, the receptacle having first and second split contact pins of different first and second diameters, comprising:

an elongated coaxial shaft connector, the shaft connector having a body configured to extend between, engage and secure a first and a second housing;

a first bore in said first housing, the first housing attached to one end of the elongated coaxial shaft connector, the first bore having a first opening at a first end of the first housing, the first opening having a first diameter greater than the diameter of the first split contact pin of the receptacle;

the first bore has an entrance at the first end of the housing, the entrance of the first bore comprising a third bore having an inner diameter larger than an inner diameter of the first bore forming a shoulder;

a second bore in said second housing, the second housing attached to a second end of the elongated coaxial shaft connector, the second housing being axially opposite the first housing, the second bore having an opening in the second housing, the opening of the second bore having a second diameter greater than the diameter of the second split contact pin of the receptacle;

a first separating wedge element having a substantially pointed tip fixedly located in the first bore at a predetermined distance from the opening of the first bore;

a second separating wedge element having a substantially pointed tip fixedly located in the second bore at a predetermined distance from the opening of the second bore;

the first separating wedge element is mounted on one end of a first solid insert, the first solid insert securely lodged in the first bore; and the second separating wedge element is mounted on a second solid insert, the second solid insert securely lodged in the second bore;

the first bore adapted to receive one of the first split contact pins having the first diameter when the first opening in the housing is aligned over the first split contact pin, and the first bore and the first separating wedge element are advanced over the first split contact pin and the first separating wedge element enters and enlarges the gap between the prongs of the first split contact pin;

the second bore adapted to receive one of the second split contact pins having the second diameter when the second opening in the housing is aligned over the second split contact pin, and the second bore and the second separating wedge element are advanced over the second split contact pin and the second separating wedge element enters and enlarges the gap between the prongs of the second split contact pin.

2. The tool of claim 1, wherein:
at least one of the first and second wedge elements has a linearly extending substantially pointed tip.

3. The tool of claim 2, wherein:
the first separating wedge element is mounted on one end of a first solid insert, the first solid insert securely lodged in the first bore; and
the substantially pointed tip of the first separating wedge element extends in a perpendicular direction in relation to an axial length of the first solid insert.

4. The tool of claim 2, further including:
at least one axially extending marking on an outside surface of the at least one first and second housing adjacent the at least one of the first and second separating wedge elements, the marking indicating the direction the substantially pointed tip of the at least one of the first and second separating wedge element is extending.

5. The tool of claim 2, further comprising:
at least one transparent portion of the at least one of said first and second housing; the at least one transparent portion aligned with and adjacent to the at least one of the first and second separating wedge elements, the separating wedge elements disposed in the at least one of said first and second housing.

6. The tool of claim 1, wherein:
at least one of the first and second wedge elements is conical in shape.

7. The tool of claim 6, wherein:
the at least one of the first and second separating wedge elements having a substantially pointed tip, the at least one of the separating wedge elements removably inserted in the first bore and in the second bore, respectively, and
the substantially pointed tips of the separating wedge elements are in communication with the opening of the first bore and the second bore, respectively.

8. The tool of claim 1, comprising:
the first bore extending partially along the axial length of the housing;
the first separating wedge element located in the first bore at a predetermined distance from the opening of the first bore;
the first bore adapted to receive one of the first dual-prong male electrical split contact pins when the opening in the first bore of the first housing is aligned over the one first pin, and the first housing and the first separating wedge element are advanced over the one first pin and the first separating wedge element enters and enlarges the gap between the dual prongs of the one first pin.

9. The tool of claim 8, further comprising:
the second bore extending partially along the axial length of the second end of the housing;
the second separating wedge element located in the second bore at a predetermined distance from the opening of the second bore;
the second bore adapted to receive one of the second dual prong male electrical split contact pins when the opening in the second bore of the housing is aligned over the one second pin, and the housing and the second separating wedge element are advanced over the one second pin and the second separating wedge element enters and enlarges the gap between the dual prongs of the second one pin.

10. The tool of claim 1, wherein:
a guide insert disposed in the third bore, the guide insert having a fourth bore in axial alignment with the first bore;
the guide insert located adjacent the substantially pointed tip of the first separating wedge element.

11. The tool of claim 10, wherein:
the guide insert is composed of a malleable material.

12. The tool of claim 10, wherein:
the third bore includes a radially inwardly extending flange circumscribing an entrance to the third bore;
the guide insert held in place in said third bore by the radially inwardly extending flange.

13. The tool of claim 1, wherein:
the elongated coaxial shaft connector having an outer surface; and
the outer surface of the elongated coaxial shaft connector having contiguous flat surfaces.

14. The tool of claim 13, wherein:
the elongated coaxial shaft connector is a hexagonal configuration in cross section.

15. A tool for separating the dual-prong male electrical split contact pins in a truck trailer electrical system receptacle, the dual prong male electrical contact split pins having a gap between prongs, the receptacle having first and second split contact pins of different first and second diameters, comprising:
an elongated coaxial shaft connector, the shaft connector having a body configured to extend between, engage and secure a first and a second housing;
a first bore in said first housing, the first housing attached to one end of the elongated coaxial shaft connector, the first bore having a first opening at a first end of the first housing, the first opening having a first diameter greater than the diameter of the first split contact pin of the receptacle;
a second bore in said second housing, the second housing attached to a second end of the elongated coaxial shaft connector, the second housing being axially opposite the first housing, the second bore having an opening in the second housing, the opening of the second bore having a second diameter greater than the diameter of the second split contact pin of the receptacle;
a first separating wedge element having a substantially pointed tip fixedly located in the first bore at a predetermined distance from the opening of the first bore;
a second separating wedge element having a substantially pointed tip fixedly located in the second bore at a predetermined distance from the opening of the second bore;
the first bore adapted to receive one of the first split contact pins having the first diameter when the first opening in the housing is aligned over the first split contact pin, and the first bore and the first wedge element are advanced over the first split contact pin and the first wedge element enters and enlarges the gap between the prongs of the first split contact pin;
the second bore adapted to receive one of the second split contact pins having the second diameter when the second opening in the housing is aligned over the second split contact pin, and the second bore and the second wedge element are advanced over the second split contact pin and the second wedge element enters and enlarges the gap between the prongs of the second split contact pin;

first and second insert elements removably and replaceably inserted into the first and second bore, respectively;

each of the first and second insert elements having a third bore extending through a portion of an axial length of the first and second insert elements, a portion of the third bores having a first inner diameter;

the third bores including a portion having a second inner diameter;

a second insert element removably and replaceably inserted into said portion of each of said third bores having the second inner diameter, each substantially pointed tip mounted on one end of each of the second insert elements;

each substantially pointed tip extending into a portion of the third bores.

16. The tool of claim 15, wherein:

the third bore portions having the first inner diameter including a roughened surface portion;

the roughened surface portion configured to remove extraneous material from surfaces of the prongs of the split contact pins upon removal of the tool from the prongs.

17. The tool of claim 15, further comprising:

a first threaded operative connection between each of a wall of the first and second bores of the housing and an axial extending outer surface of the first and second insert elements.

18. The tool of claim 15, further comprising:

a second threaded operative connection between each of a wall of the portion of the third bore of the first and second insert elements having the second inner diameter and an axial extending outer surface of each of the first and second insert elements.

* * * * *